United States Patent [19]
Walters

[11] Patent Number: 5,937,503
[45] Date of Patent: Aug. 17, 1999

[54] APPARATUS FOR MANUFACTURING A DIMPLE COMPENSATED LAMINAR STACK

[75] Inventor: Harry J. Walters, Pittsburgh, Pa.

[73] Assignee: Oberg Industries, Freeport, Pa.

[21] Appl. No.: 08/996,062

[22] Filed: Dec. 22, 1997

Related U.S. Application Data

[62] Division of application No. 08/782,985, Jan. 14, 1997, Pat. No. 5,771,565.

[51] Int. Cl.$^6$ ..................................................... H02K 15/02
[52] U.S. Cl. .............................. 29/564.2; 29/596; 29/598; 29/609; 29/705; 29/564.6; 29/732
[58] Field of Search .............................. 29/596, 598, 609, 29/564.1, 564.2, 564.6, 736, 732, 705; 310/42, 216–218

[56] References Cited

U.S. PATENT DOCUMENTS

| | | |
|---|---|---|
| 3,202,851 | 8/1965 | Zimmerle et al. . |
| 4,538,345 | 9/1985 | Diederichs . |
| 4,619,028 | 10/1986 | Neuenschwander . |
| 5,349,741 | 9/1994 | Neuenschwander . |

*Primary Examiner*—Carl E. Hall
*Attorney, Agent, or Firm*—Buchanan Ingersoll, P.C.

[57] ABSTRACT

An apparatus and method for manufacturing laminated parts from a plurality of laminas, in which the laminas for forming the laminated parts are blanked from strip stock material. The laminas and are then cut and stacked to form the laminated part. The apparatus includes a measuring device, such as a linear variable differential transducer, for measuring the thickness of successive sections of the strip stock at a first location of each section. The measuring device also measures the thickness of the strip stock sections at a second location of each section. A controller, such as a computer or a programmable logic controller, receives the thickness values at the first location and second location of the strip stock sections from the measuring device and computes a value of a difference therebetween. The controller also computes a running sum of the difference values for the strip stock sections and compares the difference values sum to a predetermined value. A punching device, such as one or more front and rear slide operated punches, is also included which is activated by the controller to provide a protuberance at selected locations upon the strip stock sections when the sum of the difference values determined by the controller equals or exceeds the predetermined value. Respective air valves and cylinders may operatively connect to each punch to cause the punch to impart a protuberance upon receipt of an appropriate signal from the controller. The protuberance has a depth approximately equal to the predetermined value.

6 Claims, 5 Drawing Sheets

APPARATUS FOR MANUFACTURING A DIMPLE COMPENSATED LAMINAR STACK

This application is a division of application Ser. No. 08/782,985, filed Jan. 14, 1997, now U.S. Pat. No. 5,771,565.

BACKGROUND OF THE INVENTION

1. Field of the Invention

The present invention relates generally to methods and apparatus for forming parts by the successive stacking of a number of laminas, and more particularly to such methods and apparatus for maintaining the vertical truness of the stack of such laminas.

2. Description of the Prior Art

It is well known that certain structures may be formed by the stacking of a series of laminations or laminas. For example, elements of electric motors, solenoids and transformers may be formed by this process. Typically, the laminas are blanked from continuous strip stock and then stacked and bound together to form the part being manufactured. However, due to imperfections of the strip stock, thickness variations of the strip stock often occur and may thus cause the part being formed from successive layers of the laminas to incur parallelism error (i.e., "leaning"). This parallelism error occurs because in stacking the laminas, the relatively thicker portions of the laminas are directly overlaying one another, and the relatively thinner portions of the laminas directly overlie one another. Parallelism error is depicted in prior art FIG. 1. During the stacking of the individual laminations 10, one side 12 of the stack becomes higher than the opposite side 14 of the stack, which in turn results in a leaning or bending of the stack.

Techniques have been developed in the industry for attempting to overcome this leaning condition of the stack. For example, it is known in the industry to rotate the stack for symmetrical laminas so that the relatively thicker portion of each lamina does not directly overlie or underlie the relatively thicker portion of adjacent laminas. Typically the stack is rotated 180° prior to the laying of each lamina. Of course, instead of rotating the stack, each lamina may be rotated while the position of the stack is kept constant to achieve the same result. U.S. Pat. No. 4,619,028 to Neuenschwander describes this solution to the problem associated with parallelism error.

Rotating the laminas in order to reduce the effects of parallelism error may be performed if the laminas are symmetrical. However, this rotational technique cannot be used for laminations that are not symmetrical to overcome the effects of transverse thickness variations in the laminas.

It is also generally known in the industry to provide laminas with depressions, known in the industry as "dimples". Heretofore, dimples have been provided on laminas in order to provide separation between adjacent laminas when the stacked laminas are to be annealed. Separation of the laminas during the annealing process of the stack is advantageous because it allows for the surfaces of the laminas to be in fluid communication with the ambient atmosphere during the annealing process. Heretofore, dimples have been provided upon the laminas such as by using alternating dies in which both the dies locate the dimples on alternating sides of the lamina so that the dimples do not overlie one another as described in U.S. Pat. No. 4,538,345 to Diederichs. In addition to using alternating dies, dimples have also been provided upon alternating sides of the laminas by rotating the laminas as described in U.S. Pat. No. 5,349,741 to Neuenschwander.

Methods and apparatus are needed to effectively overcome the effects of parallelism error during the fabrication of structures by the stacking of laminations. Such methods and apparatus should not require the rotation of individual laminas or of the lamina stack and which may therefore be utilized in connection with symmetrical as well as nonsymmetrical laminas.

SUMMARY OF THE INVENTION

A method and apparatus is provided for manufacturing laminated parts from a plurality of laminas. The laminas for forming the laminated parts are blanked from strip stock material and are then stacked to form the laminated part. The present method and apparatus maintains the parallelism of the stack of laminas, despite variations in the transverse thickness in such laminas. Laminas that are symmetrical as well as nonsymmetrical in their planar shape may be employed in connection with the present method and apparatus. In this way, the need to rotate the laminas as well as the mechanisms required for such rotation are eliminated.

The present method involves measuring the thickness at a first location of the strip stock at a particular length along the strip stock and measuring the thickness at a second location of the strip stock at roughly the same length along the strip stock as the first location. One longitudinal side of the strip stock is referred to in the industry as the "front" of the strip stock. The opposite longitudinal side of the strip stock is referred to in the industry as the "rear" of the strip stock. The first location is preferably a point along the front side of the strip stock. The second location is preferably a point along the rear side of the strip stock. Therefore, the measurements taken in accordance with the present invention are preferably taken at opposite sides of the strip stock at a particular length of the strip stock. It is understood that the terms "front side" and "rear side", as used herein, include the front half and the rear half, respectively, of the strip stock.

As is well known in the industry of progressive dies, the strip stock is indexed forward through the dies, so that successive sections of the strip stock are punched. The strip stock is indexed forward an amount roughly equal to the length of a lamination following each stroke of the stamping tool. It is preferred that the measuring device measures the thickness of the strip stock at roughly the same increments along the length of the strip stock as the strip stock is advanced for each lamination. Therefore, the lengths of the strip stock at which the measurements are taken correspond to successive sections of the strip stock.

Next, the difference between the thickness values at the first location and the second location is computed for that section of strip stock. The process is repeated for a number of sections of the strip stock so that a number of thickness difference values are measured for the respective sections of the strip stock. The thickness difference values for the various sections of the strip stock are then summed. Then, a protuberance or dimple is provided upon a section of the strip stock at one or more locations when the sum of the thickness difference values equals or exceeds some predetermined value.

A protuberance is provided on a section of strip stock to compensate for the difference in thickness between the front side of the strip stock and the rear side. Thus, the protuberance preferably has a depth equal to the predetermined difference value. In operation, when the sum of the difference values equals or exceeds the predetermined difference value and the thickness values at the rear side of the strip stock are greater than the thickness values at the front side of the strip stock, a protuberance is provided on the front side of the strip stock. Likewise, when the sum of the difference values equals or exceeds the predetermined difference value and the thickness values at the front side of the strip stock are greater than the thickness values at the rear side of the strip stock, a protuberance is provided on the rear side of the strip stock.

The present system is comprised of a measuring device to measure the thickness of the strip stock at opposite sides of the strip stock. The measuring device preferably consists of measuring probes placed in line with the outer sides of the strip stock prior to the stamping tool. The measuring probes are preferably linear variable differential transducers. The system also includes a controller which receives the output from the measuring device, sums that output and compares it to a predetermined differential value. The system further includes slide operated punches in a lamination stamping tool.

When the predetermined differential value is met or exceeded by the sum of the measured values, a signal is sent by the controller to the front set or the rear set of slide operated punches. The punches are normally maintained in the retracted position so that when the stamping tool performs its stamping movement, the punches do not create protuberances in the strip stock. Upon receipt of a signal from the controller, the punches are moved into the extended position. The slide operated punches are placed in the die at an appropriate point in the progression so that when in the extended position, the punches will form protuberances selectively on the front or rear half of the strip stock.

The protuberances will be formed in either the front side or the rear side of the strip stock, and the punches will then return to the retracted position, so that subsequent sections of strip stock will not receive a protuberance. As is understood in the progressive die industry, adjacent sections of strip stock will be cut into laminations which will be stacked adjacent to one another in the lamination stack. In this way, one lamination having protuberances will abut with adjacent laminations that do not have protuberances, spacing them sufficiently to overcome the thickness deficiency over a number of laminations. The protuberances may be placed on either of the front and rear sides of the strip stock so that any thickness deficiency can be addressed regardless of which side of the strip stock is under thickness.

The controller accepts a value relating to the acceptable tolerance for the "lean" or parallelism of the lamination stack. The thickness of the steel strip material is measured on each stroke of the die at a location along the strip stock approximately where the front and rear sides of the planar lamination will be located when the lamination is formed in the die. A value representing the depth of the protuberance is available to the controller as a fixed or variable function depending on the method used to establish the depth of the protuberance. If the depth of the protuberance is variable, another value representing the allowable gap or number of spacing per stack is entered into the controller. The differential thickness is added algebraically until the summed differential value equals or exceeds the depth of the protuberance at which time the controller sends a signal causing the slide operated punches on the front or rear half of the strip stock to extend.

Stamping tools that produce multiple parts across the transverse (front to back) direction of the steel strip ideally would use thickness measurement at two points own each part. However, the thickness could be averaged over the width of the transverse dimension if desired.

The objects and advantages of the invention will become apparent from the following description of certain present preferred embodiments taken in conjunction with the attached drawings and the appended claims.

DETAILED DESCRIPTION OF THE PREFERRED EMBODIMENTS

The preferred embodiments disclosed herein relate to a method and apparatus for manufacturing laminated parts from a plurality of laminas. The laminas for forming the laminated parts are blanked from strip stock material and are then stacked to form the laminated part. Such stacking of laminas to form laminated parts is generally well known.

As a general overview, the present preferred method involves measuring the thickness of the strip that becomes the laminas at a first location of the strip and measuring the thickness of the strip at a second location. The first location is preferably a point along the front side of the strip and the second location is preferably a point along the rear side of the strip. Next, the difference between the thickness values at the first location and the second location is computed at points along the strip stock that will become each lamina. The sum of the thickness difference values between the first and second locations is then computed for successive measurements. Then, a protuberance or dimple is provided in a lamina at one or more locations when the sum of the thickness difference values equals or exceeds some predetermined value.

The protuberances are provided on the laminas to compensate for the difference in thickness between one location or side of the laminas and another location. For example, when the sum of the measured difference values equals or exceeds the predetermined difference value and the thickness values at the rear of the strip forming the laminas are greater than the thickness values at the front of the strip, a protuberance is provided on the front of the lamina strip. Preferably, the protuberance has a depth equal to the predetermined difference value.

Figure 1:
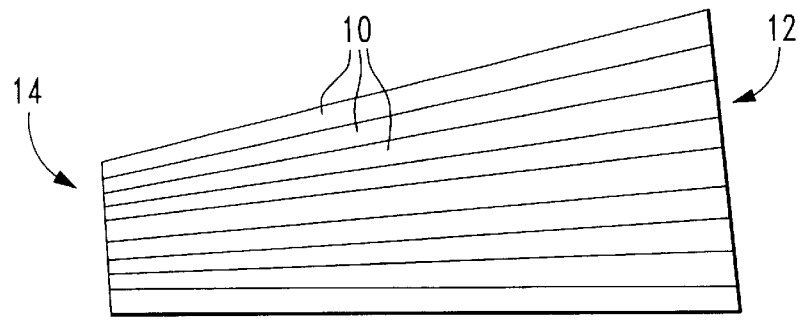
FIG. 1 is an exaggerated enlarged fragmentary elevational view of a prior art conventional stack of laminas having variations in their transverse thickness.
Figure 2:
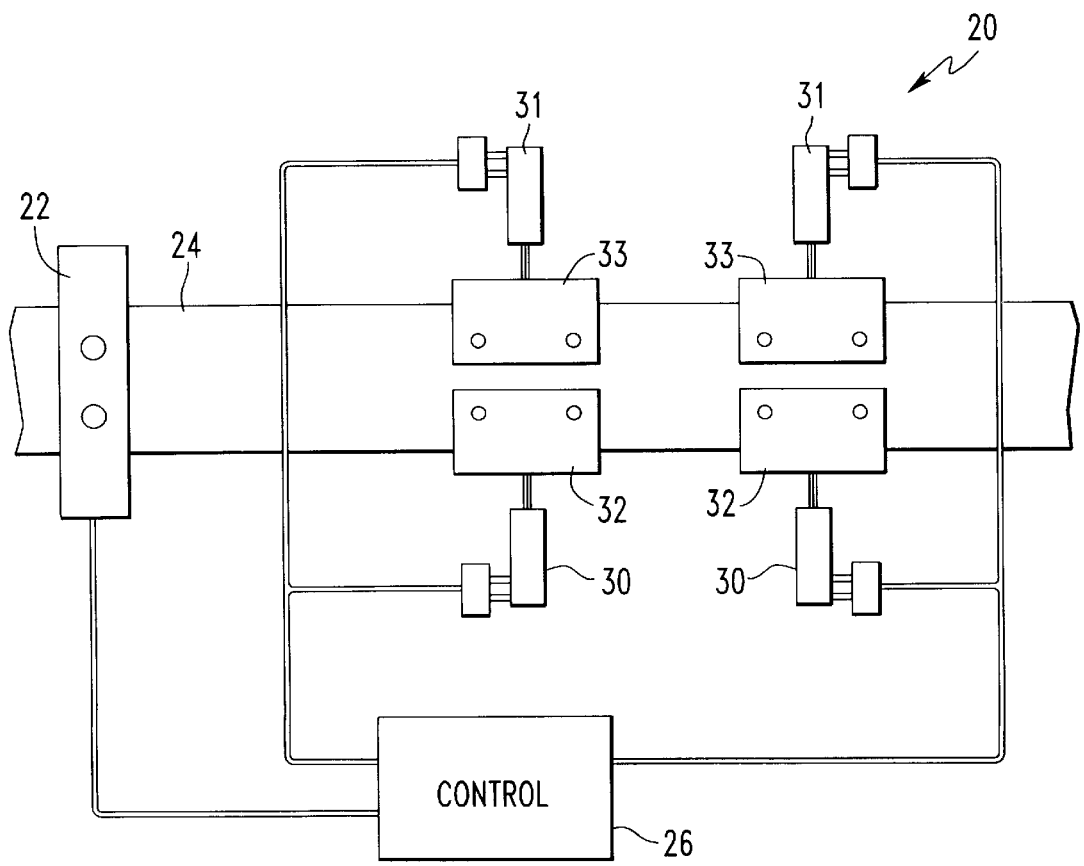
FIG. 2 is a schematic depiction of the present system for compensating laminar stacks.

Referring first to FIG. 2, the strip stock 24 is depicted, wherein each individual lamination will be cut from the strip stock 24 once the pattern for that lamination is made on the strip stock 24. The present system 20 includes a measuring device 22 to measure the thickness of the strip stock at certain locations along the strip stock 24 that will correspond to locations of each lamina. The measuring device 22 preferably consists of measuring probes placed in line with the opposite sides of the strip stock, referred to herein as the "front" 40 and the "rear" 42 of the strip stock, prior to the stamping tool. The measuring probes are preferably linear variable differential transducers, such as model GCD 121-125 made by Schaevitz.

The system 20 also includes a controller 26 which receives the output from the measuring device 22, sums that output and compares it to a predetermined value. The controller 26 is preferably a computer or Programmable Logic Controller. The controller 26 is preprogrammed to accept a value relating to the acceptable tolerance for the "lean" or parallelism of the lamination stack. A value representing the depth of the protuberance is available to the controller 26 as a fixed or variable function depending on the method used to establish the depth of the protuberance. If the depth of the protuberance is variable, another value representing the allowable gap or number of spacings per stack is entered. The differential thickness is added algebraically until the value equals or exceeds the height of the protuberance at which time the controller 26 sends a signal causing the slide operated punches 28 or 29 on the front 40 or rear 42 half of the strip stock 24 to extend.

The present system 20 further includes slide operated front and rear punches in a lamination stamping tool (the punches and stamping tool are not shown in FIG. 2 and are well-known technology), which will be described in greater detail below. As can be seen in FIG. 2, the present system 20 includes one or more front air valve and cylinders 30 operatively connected to respective front actuating wedges 32 (two front air valve and cylinders 30 are shown in FIG. 2, each operatively connected to a respective front actuating wedge 32). The front air valve and cylinders 30 and the front actuating wedges 32, in combination, can actuate the front punches to create a protuberance or protuberances upon the lamination stock 24, as will be described in greater detail below. The front air valve and cylinders 30 and the front actuating wedges 32 are operatively connected to the controller 26 so that they can be actuated upon receipt of an appropriate signal from the controller 26. The front punches are sized, configured and positioned relative to the stamping tool so as to impress a protuberance upon the lamination stock 24 when appropriately actuated.

As can also be seen in FIG. 2, the present system 20 further includes one or more rear air valve and cylinders 31 operatively connected to respective rear actuating wedges 33 (two rear air valve and cylinders 31 are shown in FIG. 2, each operatively connected to a respective rear actuating wedge 33). The rear air valve and cylinders 31 and the rear actuating wedges 33, in combination, can actuate the rear punches to create a protuberance or protuberances upon the lamination stock 24, as will be described in greater detail below. The rear air valve and cylinders 31 and the rear actuating wedges 33 are operatively connected to the controller 26 so that they can be actuated upon receipt of an appropriate signal from the controller 26. The rear punches are sized, configured and positioned relative to the stamping tool so as to impress a protuberance upon the lamination stock 24 when appropriately actuated.

Figure 3:
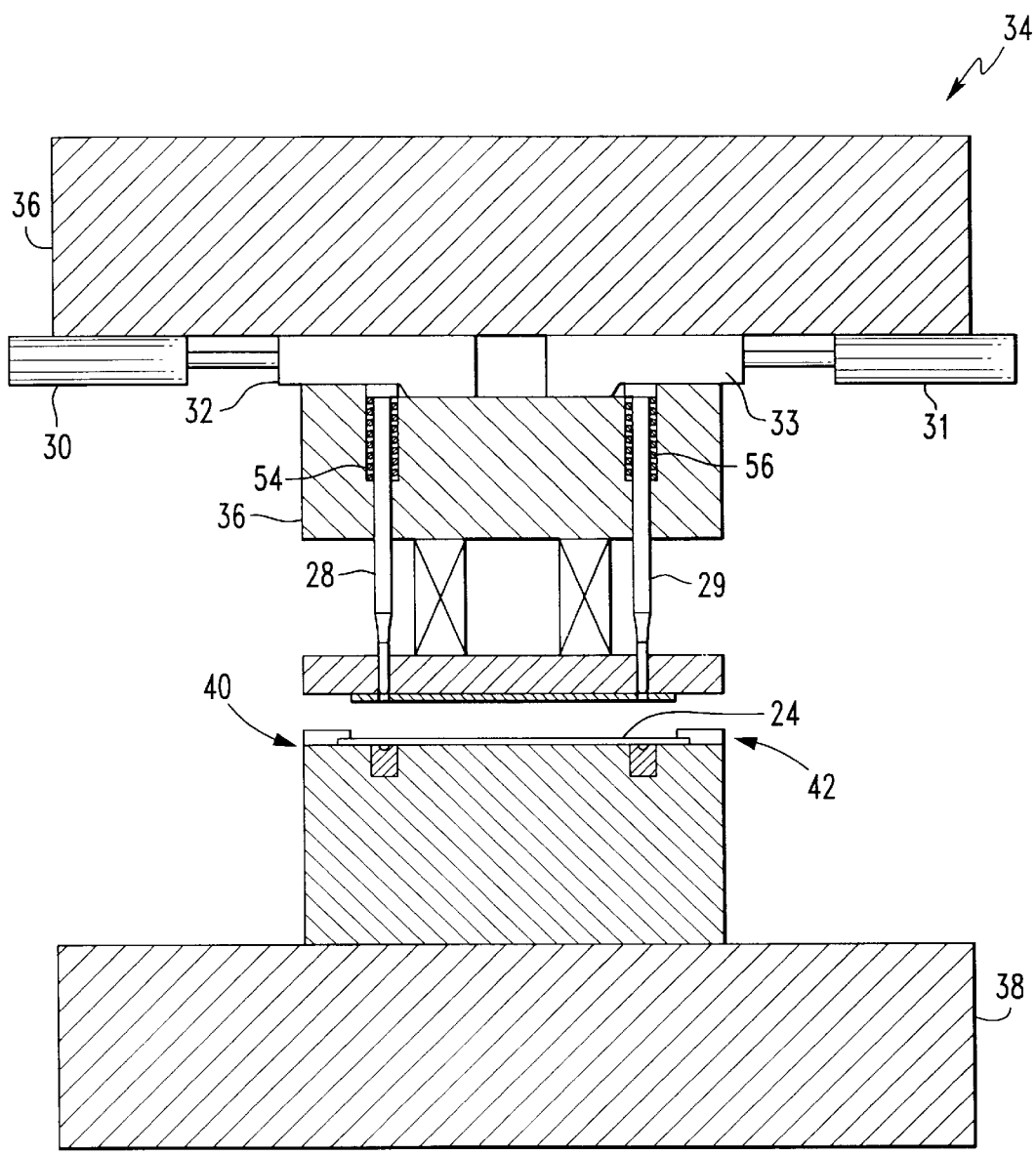
FIG. 3 is a cross-sectional view of a stamping tool used in connection with the preferred system, in which the punches are shown in the retracted position.
Figure 4:
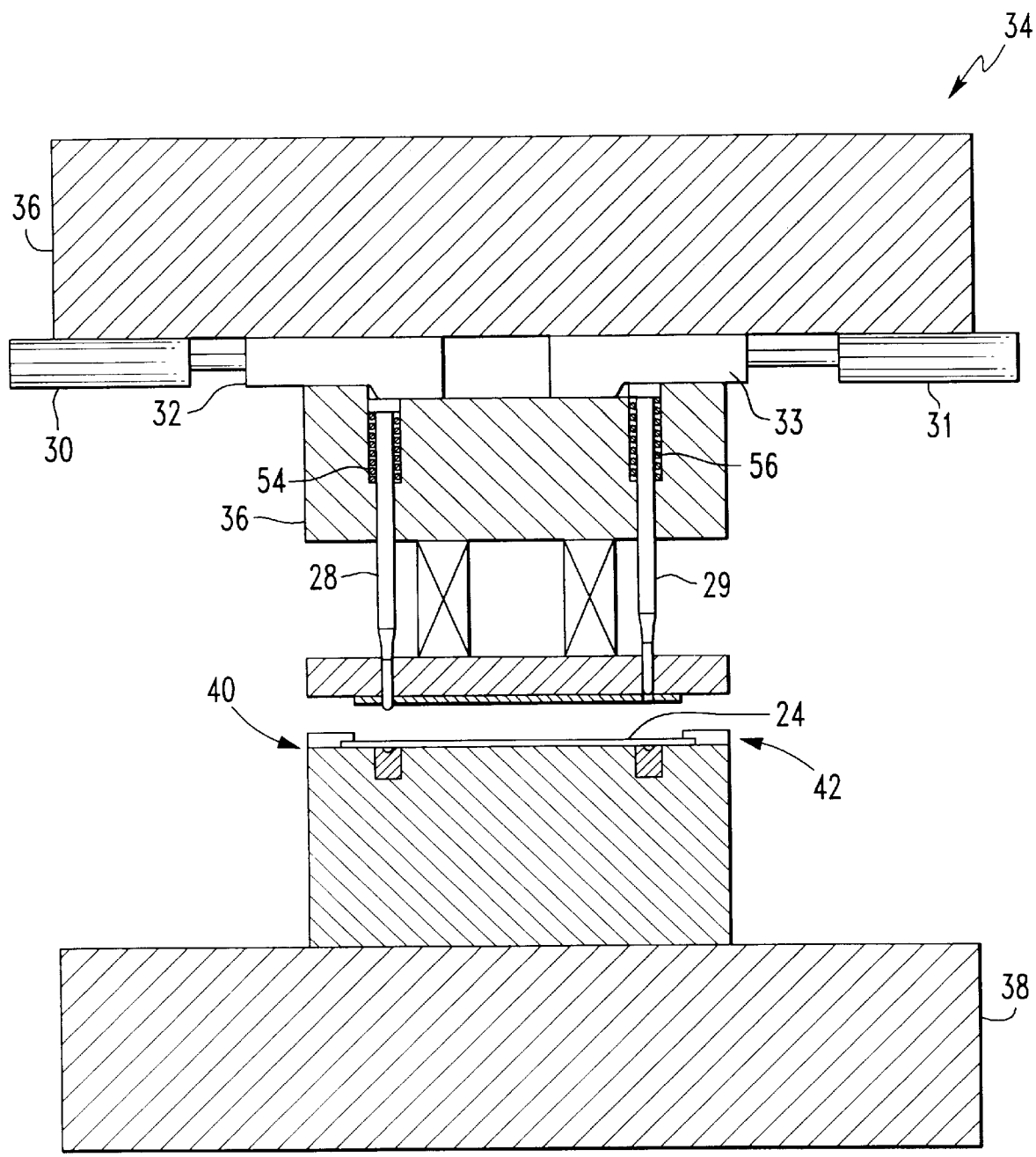
FIG. 4 is a cross-sectional view of a stamping tool used in connection with the preferred system in which the front punch is shown in the extended position.

Referring next to FIGS. 3 and 4, the operation of the stamping tool 34 and the punches will be described. Referring first to FIG. 3, a cross sectional view of the stamping tool 34 is shown. The stamping tool 34 has an upper portion 36 as well as a lower portion 38. The strip stock 24 is also shown and would move toward the viewer viewing FIG. 3. It is customary in the industry to designate the side of the stamping tool 34 and the strip stock 24 indicated as reference numeral 40 in FIG. 3 as the "front" of the lamination stock 24 and stamping tool 34. Likewise, it is also customary in the industry to designate the side of the stamping tool 34 and the strip stock 24 indicated as reference numeral 42 as the "rear."

As can be seen in FIGS. 3 and 4, one or more front punches 28 and one or more rear punches 29 are shown incorporated into the stamping tool 34. Preferably, punches 28, 29 are movably disposed through a portion of the stamping tool 34, as described herein. The front air valve and cylinders 30 and the front actuating wedges 32 as well as the rear air valve and cylinders 31 and the rear actuating wedges 33 are also operatively incorporated within the stamping tool 34.

The front air valve and cylinder 30 may cause or otherwise enable the front actuating wedge 32 to be moved forward to the position shown in FIG. 3. When the actuating wedge 32 is in the position shown in FIG. 3, the front punch 28 does not extend out of the upper portion 36 of the stamping tool 34 and the front punch 28 is said to be in the retracted position. It is preferred that the front punch 28 is biased by one or more springs 54 so as to be maintained in the retracted position in the absence of external forces. Therefore, when the stamping tool upper portion 36 is forced downward by a suitable press ram, the front punch 28 will not contact the strip stock 24.

The rear air valve and cylinder 31 may also cause or otherwise enable the rear actuating wedge 33 to be moved forward with respect to the rear actuating wedge 33. Thus, the rear actuating wedge 33 may be moved into a position, as shown in FIG. 3 in which the rear punch 29 does not extend out of the upper portion 36 of the stamping tool 34 and the rear punch 29 is said to be in the retracted position. It is preferred that the rear punch 29 is biased by one or more springs 56 so as to be maintained in the retracted position in the absence of external forces. Therefore, when the stamping tool upper portion 36 is forced downward by a suitable press ram, the rear punch 29 will not contact the strip stock 24.

Referring next to FIG. 4, it will be demonstrated how either or both of the front and rear punches 28, 29 may be extended outward from the stamping tool upper portion 36. As shown in FIG. 4, the front air valve and cylinder 30 causes the front actuating wedge 32 to be moved linearly so that a relatively thicker portion of the actuating wedge 32 overlays and contacts the front punch 28. Such contact by the front actuating wedge 32 with the front punch 28 forces the front punch 28 downward so that a portion of the front punch 28 extends outward from the stamping tool upper portion 36. While in this extended position, the front punch 28 will contact strip stock 24 when the stamping tool upper portion 36 is forced downward by a suitable press ram.

Thus, when the predetermined differential value is met or exceeded by the sum of the differential values, as measured by the measuring device 22, a signal is sent by the controller 26 to the front set or the rear set of slide operated punches 28, 29. The punches 28, 29 are normally maintained in the retracted position. Upon receipt of the signal from the controller 26, the punches 28, 29 are moved into the extended position. The slide operated punches 28, 29 are placed in the die at an appropriate point in the progression so that when in the extended position, the punches 28, 29 will form protuberances selectively on the front or rear half of the planar lamination.

It is distinctly understood that either or both of the front and rear punches 28, 29 as well as the air valves and cylinders 30, 31 and actuating wedges 32, 33 may be placed in either of the stamping tool upper portion 36 or the stamping tool lower portion 38. It is likewise distinctly understood that although it is preferred that a press ram move the stamping tool upper portion 36 downward into stamping contact with the strip stock 24, it is likewise possible to configure the stamping tool 34 so that the stamping tool lower portion 38 is moved upward so that the strip stock 24 is moved into stamping contact with either of the front or rear punches 28, 29.

As is generally understood in the progressive die industry, the strip stock 24 is preferably indexed forward following each stroke of the stamping tool. Thus, successive sections of the strip stock are punched by a particular die.

Figure 5:
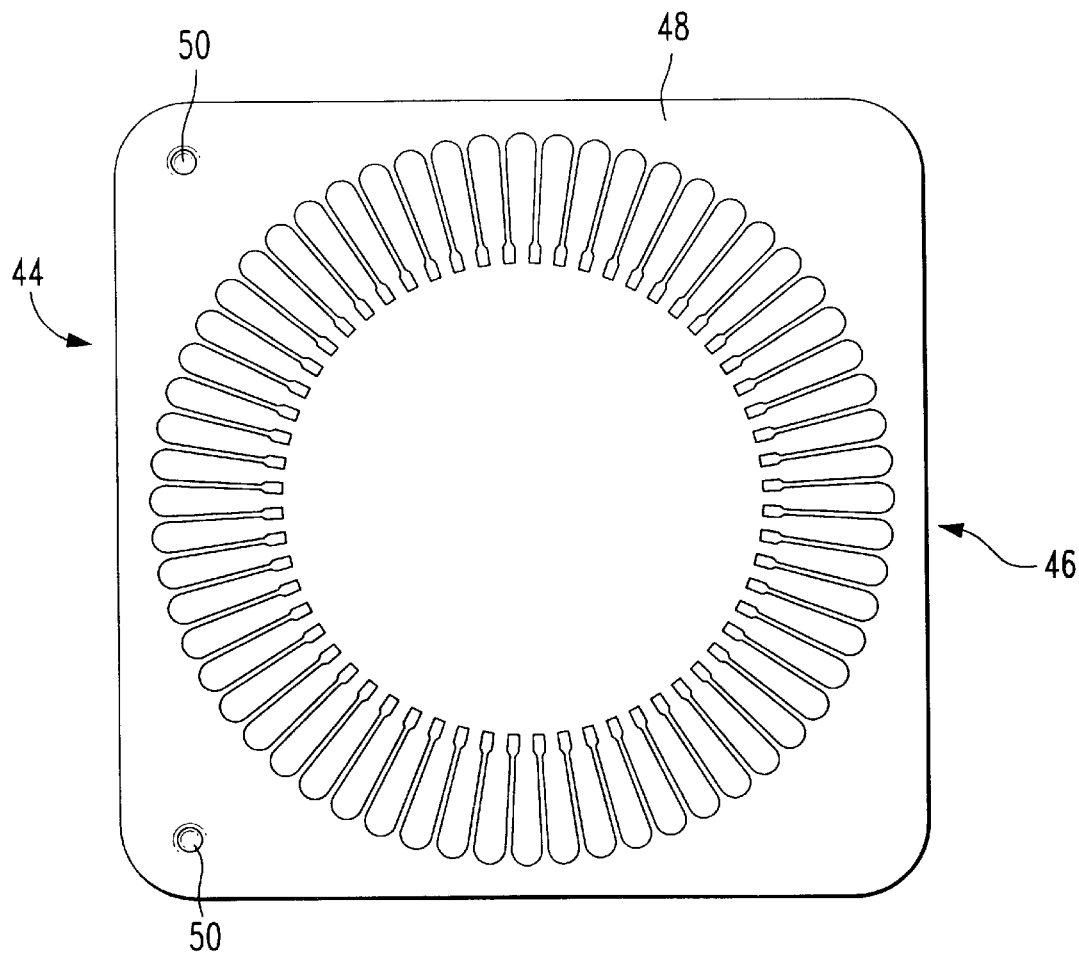
FIG. 5 is a top elevational view of a lamination having dimples formed thereof in accordance with the present system.

A stamped, cut lamination 48 is shown in FIG. 5. The designations of the "front" and "rear" are maintained with respect to the lamination 48 and the front of the lamination 48 is designated as 44 while the rear of the lamination 48 is designated as 46. The lamination 48 includes two protuberances 50 disposed along the front 44 of the lamination 48. Thus, the strip stock from which the lamination 48 was formed had a relatively thinner front side 44 than a rear side 46.

Figure 6:
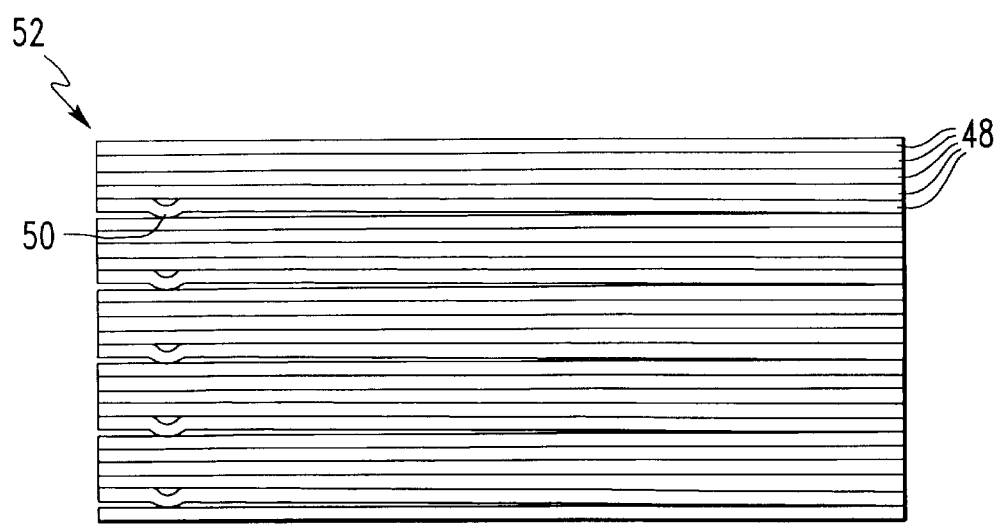
FIG. 6 is a stack of laminations showing protuberances on selected laminations.

Referring next to FIG. 6, a stack 52 of laminations 48 is shown. As can be seen in the Figure, the protuberances 50 formed on selected laminations 48 cooperate with adjacent laminations to raise the portion of the lamination stack 52 having the protuberances 50. Again, the strip stock from which the laminations 48 were formed had relatively thinner front sides 44 than rear sides 46.

Figure 7:
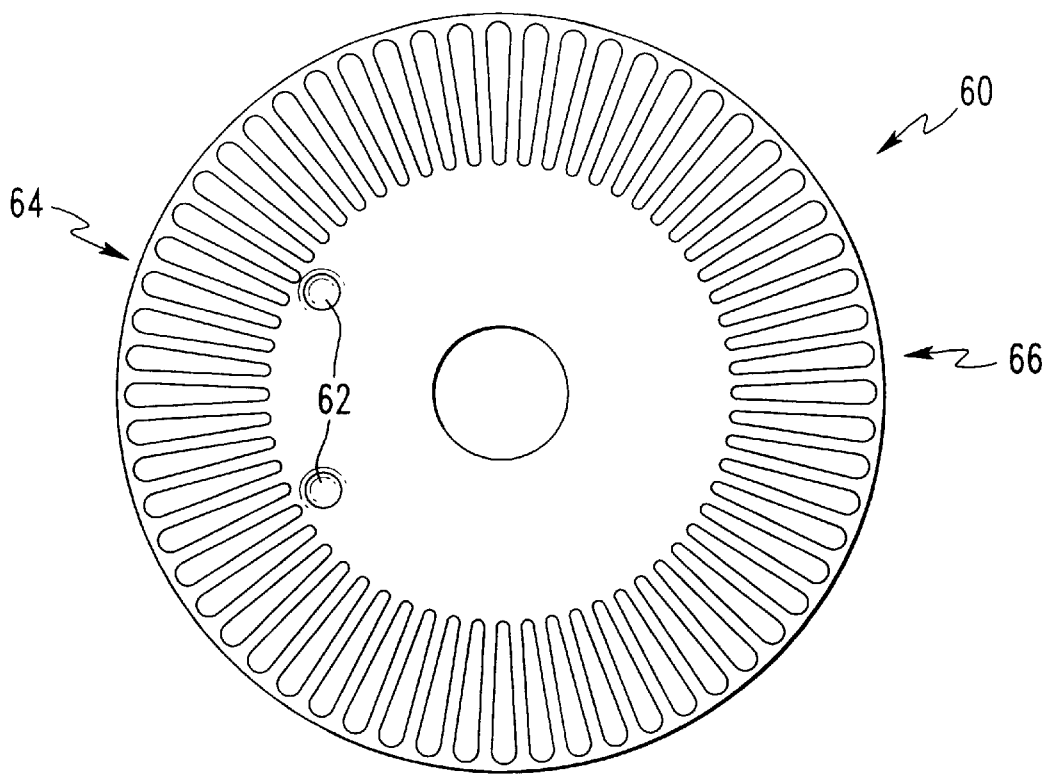
FIG. 7 is a top view of a lamination showing protuberances formed thereon in accordance with the present system.

Referring next to FIG. 7, another lamination 60 is shown. Here, protuberances 62 are again provided on the front side 64 of the lamination 60. Thus, the front side 64 of the lamination 60 is relatively thinner than the rear side 66 of the lamination 60.

Figure 8:
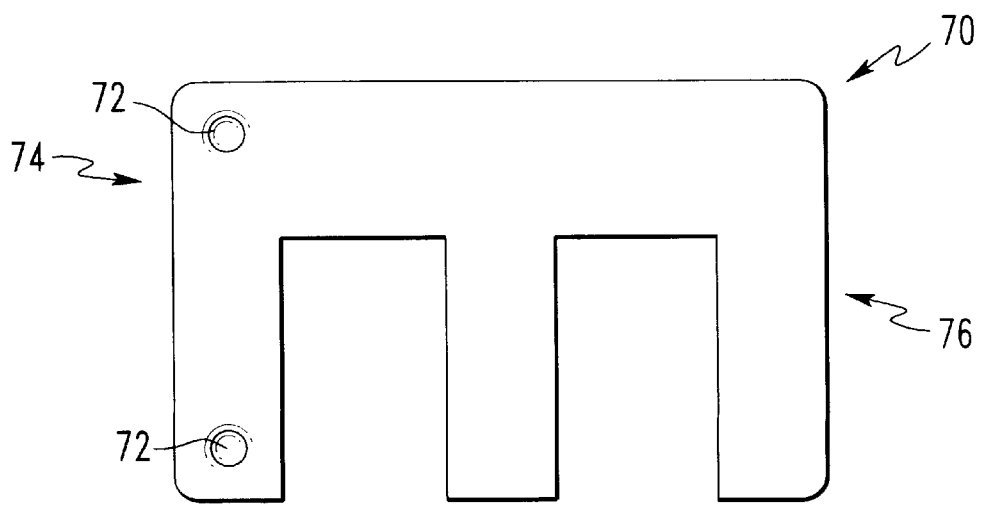
FIG. 8 is a lamination showing protuberances formed thereon in accordance with the present system.

Referring next to FIG. 8, yet another lamination 70 is shown. The lamination 70 is not symmetrical. Nonetheless, the present invention may be employed with respect to the asymmetrical lamination 70. Protuberances 72 are provided on the front side 74 of the lamination 70. Thus, the front side 74 of the lamination 70 is relatively thinner than the rear side 76 of the lamination 70.

Any number of punches may be utilized in connection with the present invention. Likewise, any number of measurements may be taken along the length or along the width of the strip stock. Thus, for example, stamping tools that produce multiple parts across the transverse direction of the strip stock ideally would use thickness measurement at two points on each part. However, the thickness values could be averaged over the width of the transverse dimension if desired.

While certain present preferred embodiments have been shown and described, it is distinctly understood that the invention is not limited thereto but may be otherwise embodied within the scope of the following claims.

I claim:

1. An apparatus for manufacturing laminated parts from a plurality of laminas, wherein the laminas for forming a laminated part are blanked from strip stock material and are then stacked to form the laminated part, the apparatus comprising:

(a) a measuring device for measuring a value of thickness of a plurality of successive sections of said strip stock at a first location of said sections, and for measuring a value of thickness of said sections of said strip stock at a second location of said sections;

(b) a controller which receives from said measuring device the thickness values at said first location and said second location of said strip stock sections and computes a value of a difference therebetween, and wherein said controller also computes a running sum of said difference values for said sections of said strip stock and compares said difference values sum to a predetermined value; and (c) a punching device which is activated by said controller to provide a protuberance at selected locations upon said selected sections of said strip stock when said sum of said difference values determined by said controller equals or exceeds said predetermined value.

2. The apparatus for manufacturing laminated parts of claim 1 wherein said measuring device is at least one linear variable differential transducer.

3. The apparatus for manufacturing laminated parts of claim 1 wherein the controller is a programmable logic controller.

4. The apparatus for manufacturing laminated parts of claim 1 wherein the punching device is at least one slide operated front punch and at least one slide operated rear punch.

5. The apparatus for manufacturing laminated parts of claim 4 further comprising at least one front air valve and cylinder that is operatively connected to the controller which when activated by the controller allows the at least one slide operated front punch to provide said protuberance upon said front of said strip stock.

6. The apparatus for manufacturing laminated parts of claim 4 further comprising at least one rear air valve and cylinder that is operatively connected to the controller which when activated by the controller allows the at least one slide operated rear punch to provide said protuberance upon said rear of said strip stock.

* * * * *